(No Model.)
D. R. BERRY.
AIR VALVE.
No. 499,956.      Patented June 20, 1893.
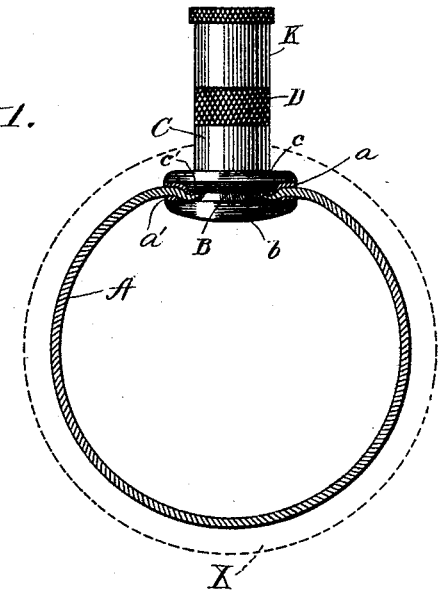
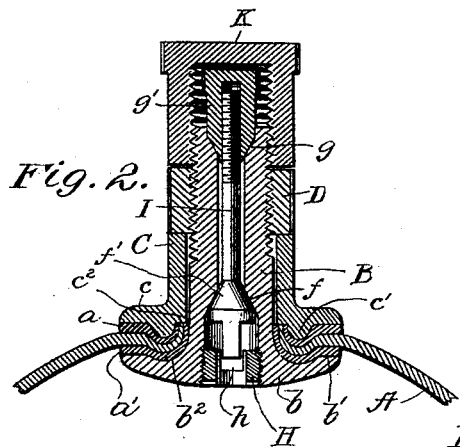
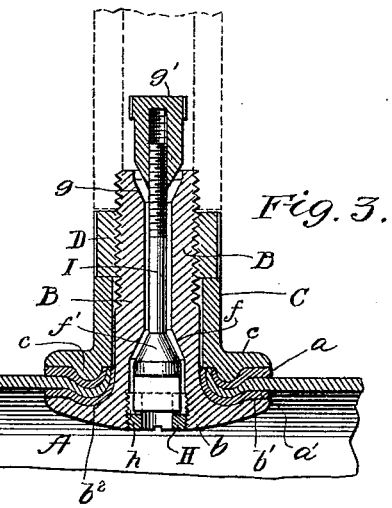
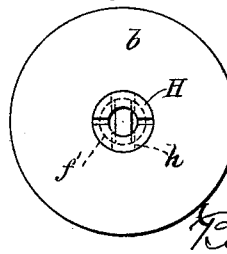
WITNESSES:
Frank S. Ober
B. W. Miller
INVENTOR
David Ross Berry
BY
Baldwin, Davidson & Wight
ATTORNEYS.

UNITED STATES PATENT OFFICE.

DAVID ROSS BERRY, OF ROCKAWAY, NEW JERSEY.

AIR-VALVE.

SPECIFICATION forming part of Letters Patent No. 499,956, dated June 20, 1893.

Application filed February 7, 1893. Serial No. 461,336. (No model.)

*To all whom it may concern:*

Be it known that I, DAVID ROSS BERRY, a citizen of the United States, residing at Rockaway, Morris county, State of New Jersey, have invented certain new and useful Improvements in Air-Valves, of which the following is a specification.

My invention relates to air valves to be attached to objects to be inflated, such for instance as pneumatic tires for bicycles or other vehicles.

The object of the invention is to provide a valve that may be readily connected with the tire or with the inflatable tube thereof in a strong, durable, efficient way, and yet permits of its disconnection from the tube without cutting or injury to the same; that prevents leakage and permits of the ready inflation and deflation of the tire; and that permits, if desired, of employing metal only and dispensing with springs and washers. To these ends, I have devised the improved construction hereinafter described and claimed.

The accompanying drawings show the invention in a form that I have found to be practical and desirable. Some of the features may, doubtless, be used without the others in constructions differing in detail somewhat from that herein shown.

Figure 1 is a view in elevation of the air valves showing the elastic tube in section, and the exterior cover in dotted lines. Fig. 2 is a sectional view of the air valve. Fig. 3 is a similar section at right angles to that shown in Fig. 2; and Fig. 4 is a bottom plan view of the air valve.

The tube A or other article to be inflated is provided with an aperture for the reception of the valve frame, and may be strengthened at this point if desirable, by interior and exterior elastic washers $a, a'$. The valve frame, in the form shown, consists of a tube or hub B having a flange $b$. This part of the device, as well as all the other parts, is preferably made of some metal not readily oxidizable or corrosive such as brass or other suitable metal or alloy. The flanged end of the valve frame is forced through the aperture in the elastic tube. The inner face of the flange nearest the edge is preferably plane as at $b'$ and within this annular plane face is an annular groove or depression $b^2$. The wall of the inflatable tube surrounding the aperture lies upon this face of the flange and is clamped between it and a loose clamping ring or follower C having a flange $c$. The face of this flange near its outer edge is plane, corresponding with the face of the flange $b$, and within such plane face is an annular rib $c'$ corresponding in shape with the depression in the flange $b$. Within this annular rib and next the bore of the follower is an annular groove or recess $c^2$. The follower passes loosely over the hub or frame A and is forced down by a nut D working on a thread on the hub.

As seen in the drawings, when the parts are clamped together, the edge of the aperture in the elastic tube is forced into the annular recess $c^2$ in the follower and the wall of the tube is clamped between the plane and interlocking faces of the two flanges. A tight connection is thus formed between the frame of the valve and the tube and the nut that clamps the follower is in turn locked by the cap K as hereinafter appears. Of course the faces of the clamping flanges might be formed otherwise than as described, and so far as the construction of the valves, hereinafter described, is concerned, the valve frame might be differently attached to the inflatable tube.

The dotted lines X represent any ordinary covering for the tube.

The bore of the hub A is contracted at the central portion and on each side of such contraction is formed a conical valve seat $f, g$. The inner end of the bore is preferably enlarged and is screw threaded for the reception of a threaded plug H having a slot $h$ therein. The valve stem I has formed on or secured to it a conical valve $f'$ that is seated at $f$ and the reduced inner end of the stem is flattened and enters the slot in the plug H. The stem passes loosely through the contracted bore and its outer end is screw threaded for the reception of a nut $g'$ having a conical face and constituting a valve that is seated at $g$. This valve nut is inclosed by a cap K screwing upon the end of the hub B and bearing against the nut D. The valve stem is placed in position and the plug H is screwed in, the flattened end of the stem lying in the slot in the plug, and the valve frame is then attached to the elastic tube as described. The plug H prevents the stem from dropping into the elastic tube, and the stem in turn, when held by its valve-nut $g'$, which is the normal condition, locks the plug against turning and prevents it from working loose from its socket. The valve $f'$ serves as a check valve during the operation of inflation. When the valve nut $g'$ is screwed up tightly both valves are firmly closed against their seats and leakage is impossible. Both the valves and their seats should be ground to a true fit and from their form they will not become impaired by wear. When it is desired to inflate the tire, the cap K is replaced by the screw cap or thimble of the compressor, the valve nut $g'$ having been loosened but not removed. There is then sufficient clearance past the valves and stem to admit air, while as before stated the valve $f'$ serves as a check valve. The desired degree of inflation having been obtained, the thimble of the compressor is removed, the valve nut $g'$ tightened up, thus firmly drawing both valves against their seats, and the cap K replaced. In screwing up the valve nut the stem is prevented from turning by the slotted plug and there is no possibility of the stem slipping or revolving, and as stated both valves must therefore be positively forced against their seats.

To deflate the tire, it is only necessary to remove the cap, loosen the valve nut, and press the spindle down slightly. This unseats the check valve $f'$ and the air escapes past the valve $g'$, which by its own pressure it then tends to unseat.

It will be seen that I dispense entirely with spring controlled valves and may use metal only,—but of course if desired the valve faces and seats might be made of hard rubber or any other suitable material. I prefer, however, to entirely dispense with any other material than metal.

My improved device is strong and is economical to construct and owing to the character of the valves, they will not in long continued use become impaired, and I may as before stated disconnect the valve entirely without injuring the elastic tube.

I claim as my invention—

1. The combination of the flanged hub, the valve devices contained therein, the flanged follower having a smooth bore, the clamping nut and the cap.

2. The combination of the flanged hub, the valve devices contained therein, the follower having a flange co-operating with the flange on the hub to clamp the tube or other device to which the hub is applied, and the nut acting on the follower to press it toward the flange of the hub.

3. The combination of the flanged hub and flanged follower formed with interlocking faces or adjacent sides between which the material is clamped, devices for pressing the follower toward the flange of the hub, and valve devices contained within the hub.

4. The combination of the hub having a flange whose face is formed with an annular outer plain portion and an inner annular groove, the follower having a flange whose face is formed with an outer plain portion and an annular rib, and an annular recess nearest the bore, devices for clamping the follower, and the valve devices contained within the hub.

5. The combination of the hub or valve frame having an enlarged inner end, and having two valve seats, the valve stem arranged longitudinally in the hub, a valve contained within a recess in the hub at said valve seat, and a valve nut adjustably secured on the opposite end of the stem and forming a closely fitting, opening and closing valve for the other seat, substantially as set forth.

6. The combination of the valve frame or hub bored longitudinally, a valve seat located within the bore of the hub near the inner end thereof, a valve stem adapted to be inserted into the inner end of the hub, and a valve carried thereby and located within the bore at the valve seat, means for holding the stem in position when inserted, a valve seat formed in the bore of the hub toward its outer end, and a nut screwing on the stem and forming a closely fitting opening and closing valve for the last named seat, substantially as described.

7. The combination of the valve frame or hub having a longitudinal bore contracted at its middle portion, and a valve seat formed at each end of the contracted portion and within the bore of the hub, a stem adapted to be inserted into the hub from its inner end, a valve carried by the stem for one of said seats, the plug removably secured to the inner end of the frame or hub, and engaging and supporting the inner end of the valve stem, and a valve nut screwing on the opposite end of the stem and constituting a valve for the other seat, substantially as described.

8. The combination of the hub or frame bored longitudinally and having a conical valve seat at opposite ends, the valve stem having a flattened end below the valve, a screw plug having a slot in which the flattened end of the stem enters, a valve for one of said seats, and a valve nut screwing on the opposite end of the stem, and constituting a valve for the other seat, substantially as described.

9. The combination of the hub or valve frame having in its bore two opposing valve seats, a valve stem extending through the longitudinal bore of the hub, two valves, one for each seat, means for drawing the valves towards each other to force them against their seats or moving them away from each other to unseat them, and means for preventing the valve stem from turning while the valves are being adjusted.

10. The combination of the hub or valve frame having in its bore two conical valve seats, a valve stem, two valves, one for each seat, means for drawing the valves toward each other to force them against their seats, or moving them away from each other to unseat them.

11. The combination of the hub or valve frame having in its bore two conical valve seats, a valve stem, two valves, one for each seat, means for drawing the valves toward each other to force them against their seats, or moving them away from each other to unseat them, and means for connecting the valve frame with the elastic tube of a pneumatic tire, substantially as described.

12. The combination of the solid hub or valve frame having a flange for its attachment to an elastic tube, and an interior bore contracted at the middle with a conical valve seat at each end of such contraction, a valve spindle adapted to be inserted into the flanged end of the hub, means mounted in said end of the hub for holding the spindle in position, a conical valve carried by the spindle for one of said valve seats, a conically faced nut screwing upon the outer end of the spindle and forming a valve for the other seat, and screw cap, substantially as set forth.

In testimony whereof I have hereunto subscribed my name.

DAVID ROSS BERRY.

Witnesses:
EDWARD C. DAVIDSON,
FRANK S. OBER.